United States Patent
Mattsson

(10) Patent No.: US 10,552,622 B2
(45) Date of Patent: *Feb. 4, 2020

(54) MULTI-LAYER SYSTEM FOR PRIVACY ENFORCEMENT AND MONITORING OF SUSPICIOUS DATA ACCESS BEHAVIOR

(71) Applicant: Protegrity Corporation, George Town, Grand Cayman (KY)

(72) Inventor: Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 324 days.

This patent is subject to a terminal disclaimer.

(21) Appl. No.: 14/564,103

(22) Filed: Dec. 9, 2014

(65) Prior Publication Data
US 2015/0096049 A1    Apr. 2, 2015

Related U.S. Application Data

(60) Continuation of application No. 14/181,825, filed on Feb. 17, 2014, now Pat. No. 8,935,787, which is a continuation of application No. 13/778,060, filed on Feb. 26, 2013, now Pat. No. 8,701,191, which is a division of application No. 11/357,741, filed on Feb. 17, 2006, now abandoned.

(60) Provisional application No. 60/654,181, filed on Feb. 18, 2005.

(51) Int. Cl.
*G06F 21/60* (2013.01)
*G06F 21/62* (2013.01)
*H04L 29/06* (2006.01)

(52) U.S. Cl.
CPC ............ *G06F 21/604* (2013.01); *G06F 21/60* (2013.01); *G06F 21/6218* (2013.01); *G06F 21/6227* (2013.01); *G06F 21/6245* (2013.01); *H04L 63/1433* (2013.01); *G06F 2221/2141* (2013.01)

(58) Field of Classification Search
CPC ..................................................... G06F 21/604
See application file for complete search history.

(56) References Cited

U.S. PATENT DOCUMENTS

| | | |
|---|---|---|
| 5,265,221 A | 11/1993 | Miller et al. |
| 5,271,007 A | 12/1993 | Kurahashi et al. |
| 5,278,901 A | 1/1994 | Shieh et al. |
| 5,283,830 A | 2/1994 | Hinsley et al. |

(Continued)

FOREIGN PATENT DOCUMENTS

| | | |
|---|---|---|
| EP | 0 999 490 | 5/2000 |
| EP | 1 315 065 | 5/2003 |

(Continued)

OTHER PUBLICATIONS

Elovici, Yuval, et al. "A structure preserving database encryption scheme." Secure Data Management. Springer Berlin Heidelberg, 2004. 28-40.*

(Continued)

*Primary Examiner* — Khalil Naghdali
(74) *Attorney, Agent, or Firm* — Fenwick & West LLP

(57) ABSTRACT

A method for controlling data access in a data-at-rest system includes executing a link intrusion prevention analysis between multiple layers of the data-at-rest system, introducing a privacy policy at enforcement points that span multiple system layers, and dynamically altering the privacy policy.

15 Claims, 9 Drawing Sheets

(56) References Cited

U.S. PATENT DOCUMENTS

| | | | |
|---|---|---|---|
| 5,572,652 A | 11/1996 | Robusto et al. | |
| 5,610,981 A * | 3/1997 | Mooney | G06Q 20/341 |
| | | | 340/5.74 |
| 5,699,514 A * | 12/1997 | Durinovic-Johri | G06F 21/31 |
| | | | 340/5.31 |
| 5,748,884 A | 5/1998 | Royce et al. | |
| 5,751,949 A | 5/1998 | Thomson et al. | |
| 6,003,084 A | 12/1999 | Green et al. | |
| 6,405,318 B1 * | 6/2002 | Rowland | G06F 21/552 |
| | | | 726/22 |
| 6,460,141 B1 | 10/2002 | Olden | |
| 6,513,060 B1 | 1/2003 | Nixon et al. | |
| 6,647,400 B1 | 11/2003 | Moran | |
| 6,754,664 B1 | 6/2004 | Bush | |
| 6,766,368 B1 | 7/2004 | Jakobson et al. | |
| 6,910,135 B1 | 6/2005 | Grainger | |
| 7,058,821 B1 | 6/2006 | Parekh et al. | |
| 7,120,933 B2 | 10/2006 | Mattsson | |
| 7,506,371 B1 * | 3/2009 | Ben-Natan | G06F 21/316 |
| | | | 726/18 |
| 7,539,857 B2 | 5/2009 | Bartlett et al. | |
| 7,610,375 B2 | 10/2009 | Portolani et al. | |
| 7,779,422 B1 | 8/2010 | Dalcher | |
| 7,874,000 B1 * | 1/2011 | Lal | G06F 21/55 |
| | | | 726/23 |
| 7,895,649 B1 | 2/2011 | Brook et al. | |
| 8,402,540 B2 * | 3/2013 | Kapoor | G06F 9/505 |
| | | | 709/224 |
| 8,661,539 B2 * | 2/2014 | Hodges | H04L 29/06 |
| | | | 709/224 |
| 8,752,173 B2 * | 6/2014 | Yadav | H04L 63/1408 |
| | | | 726/23 |
| 2001/0052014 A1 | 12/2001 | Sheymov et al. | |
| 2002/0007461 A1 | 1/2002 | Garrisson et al. | |
| 2002/0019931 A1 | 2/2002 | Prinoth et al. | |
| 2002/0023227 A1 | 2/2002 | Sheymov et al. | |
| 2002/0053020 A1 * | 5/2002 | Teijido | H04L 63/0209 |
| | | | 713/153 |
| 2002/0066038 A1 | 5/2002 | Mattsson et al. | |
| 2002/0078209 A1 | 6/2002 | Peng | |
| 2002/0112185 A1 | 8/2002 | Hodges | |
| 2002/0174352 A1 | 11/2002 | Dahl | |
| 2003/0023873 A1 * | 1/2003 | Ben-Itzhak | G06F 21/51 |
| | | | 726/26 |
| 2003/0074580 A1 * | 4/2003 | Knouse | H04L 63/0815 |
| | | | 726/4 |
| 2003/0101355 A1 | 5/2003 | Mattsson | |
| 2003/0145232 A1 * | 7/2003 | Poletto | H04L 63/1408 |
| | | | 726/22 |
| 2003/0221130 A1 * | 11/2003 | Henry | H04L 63/10 |
| | | | 726/5 |
| 2004/0078569 A1 * | 4/2004 | Hotti | G06F 21/6227 |
| | | | 713/165 |
| 2004/0083394 A1 * | 4/2004 | Brebner | G06F 21/31 |
| | | | 726/19 |
| 2004/0139448 A1 | 7/2004 | Hope et al. | |
| 2004/0181667 A1 | 9/2004 | Venters et al. | |
| 2004/0243835 A1 * | 12/2004 | Terzis | G06F 21/6218 |
| | | | 726/3 |
| 2004/0267893 A1 | 12/2004 | Lin | |
| 2005/0015626 A1 | 1/2005 | Chasin | |
| 2005/0044406 A1 * | 2/2005 | Stute | C12Q 1/6804 |
| | | | 726/4 |
| 2005/0076030 A1 * | 4/2005 | Hada | G06F 17/30938 |
| 2005/0086529 A1 | 4/2005 | Buchsbaum | |
| 2005/0108521 A1 | 5/2005 | Silhavy et al. | |
| 2005/0114711 A1 | 5/2005 | Hesselink et al. | |
| 2005/0177871 A1 * | 8/2005 | Roesch | H04L 63/0263 |
| | | | 726/13 |
| 2005/0257266 A1 | 11/2005 | Cook et al. | |
| 2006/0026273 A1 * | 2/2006 | Comay | H04L 63/1416 |
| | | | 709/223 |
| 2006/0059550 A1 * | 3/2006 | Kausik | G06Q 20/027 |
| | | | 726/11 |
| 2006/0156385 A1 * | 7/2006 | Chiviendacz | G06F 21/36 |
| | | | 726/2 |
| 2006/0179296 A1 | 8/2006 | Bartlett et al. | |
| 2006/0212593 A1 * | 9/2006 | Patrick | G06Q 10/06 |
| | | | 709/230 |
| 2006/0253906 A1 | 11/2006 | Rubin et al. | |
| 2007/0050777 A1 * | 3/2007 | Hutchinson | G06F 11/0709 |
| | | | 718/104 |
| 2007/0083928 A1 * | 4/2007 | Mattsson | G06F 21/552 |
| | | | 726/22 |
| 2007/0101425 A1 | 5/2007 | Mattsson | |
| 2008/0133935 A1 * | 6/2008 | Elovici | G06F 21/6227 |
| | | | 713/193 |
| 2009/0178144 A1 | 7/2009 | Redlich et al. | |
| 2010/0153748 A1 * | 6/2010 | Valfridsson | G06F 21/6227 |
| | | | 713/193 |
| 2011/0231443 A1 * | 9/2011 | Hannel | H04L 63/105 |
| | | | 707/776 |
| 2012/0204265 A1 | 8/2012 | Judge | |
| 2012/0210434 A1 * | 8/2012 | Curtis | G06F 21/577 |
| | | | 726/25 |
| 2013/0067575 A1 | 3/2013 | Zuk | |
| 2013/0145464 A1 | 6/2013 | Lyon | |
| 2015/0172912 A1 * | 6/2015 | Ziat | G06F 9/44505 |
| | | | 370/329 |
| 2015/0178506 A1 * | 6/2015 | Elovici | G06F 21/602 |
| | | | 713/189 |

FOREIGN PATENT DOCUMENTS

| | | |
|---|---|---|
| GB | 2 242 295 | 9/1991 |
| WO | WO 2003/044638 | 5/2003 |

OTHER PUBLICATIONS

Hwang, Min-Shiang, and Wei-Pang Yang. "Multilevel secure database encryption with subkeys." Data & knowledge engineering 22.2 (1997): 117-131.*

U.S. Appl. No. 11/357,741, filed Feb. 17, 2006, Mattsson.

International Preliminary Report on Patentability, dated Aug. 30, 2007, PCT Application No. PCT/US2006/006051, 5 pages.

International Search Report, PCT Application No. PCT/US2006/006051, dated Jun. 26, 2007, 4 pages.

Applied Cryptography Second Edition: protocols, algorithms, and source code in C; Bruce Schneier, John Wiley & Sons 1996, pp. 10-17, 193-197,208-210 and 270-278.

An Introduction to Database Systems 7th Ed.; C.J. Date, Addison Wesley Longman, Inc. 2000 pp. 43-47, 69-78, 249-253 and 520-524.

23 DBMS Obfuscation Toolkit; Oracle8i Supplied PUSQL Packages Reference Release 2, 1999.

Database Security in Oracle8i, An Oracle Technical White Paper, Nov. 1999, pp. 1-30.

United States Office Action, U.S. Appl. No. 13/778,060, dated Oct. 25, 2013, 20 pages.

United States Office Action, U.S. Appl. No. 11/357,741, dated Feb. 7, 2013, 9 pages.

United States Office Action, U.S. Appl. No. 11/357,741, dated May 18, 2012, 21 pages.

United States Office Action, U.S. Appl. No. 11/357,741, dated Dec. 28, 2009, 15 pages.

United States Office Action, U.S. Appl. No. 11/357,741, dated Apr. 2, 2009, 13 pages.

* cited by examiner

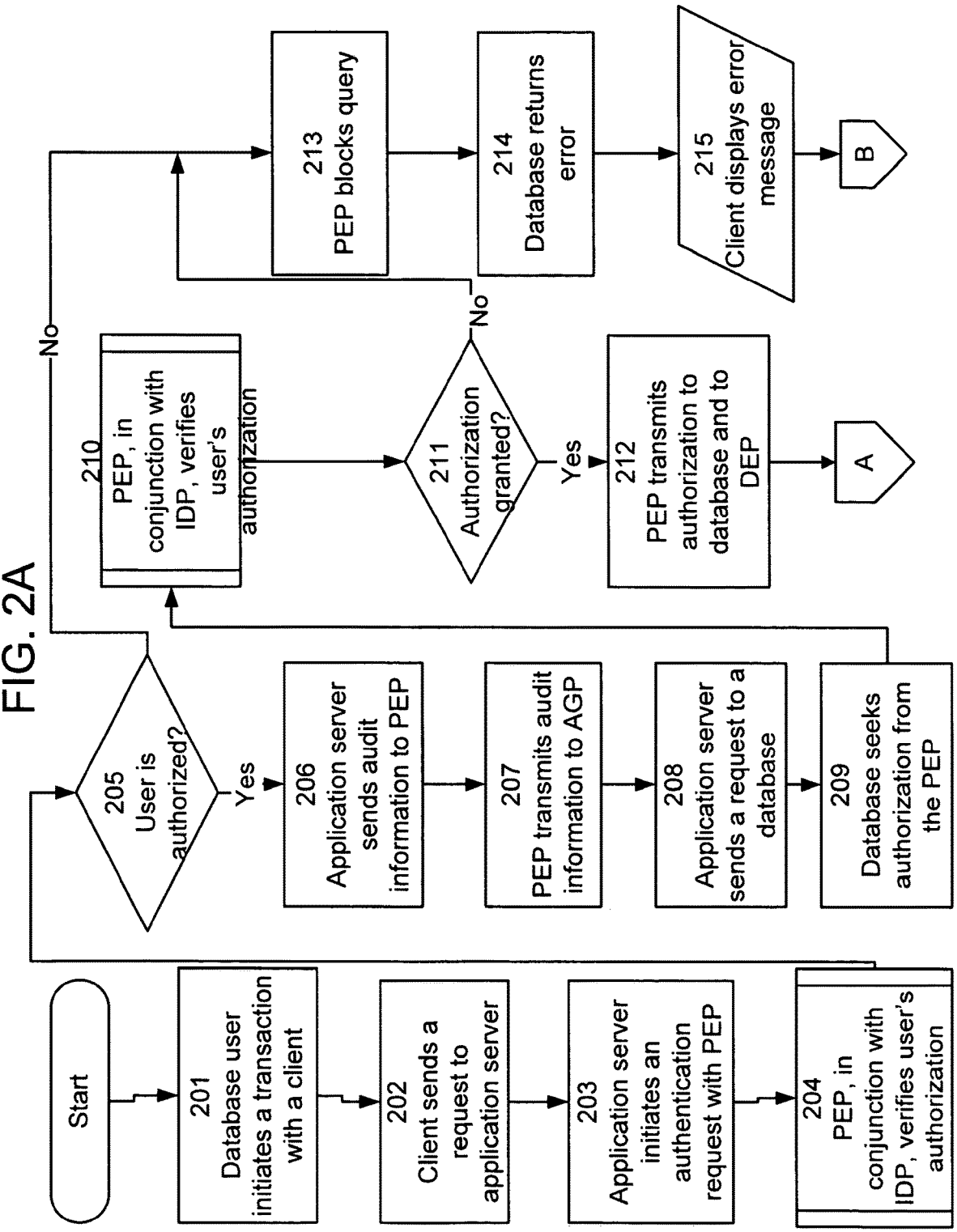

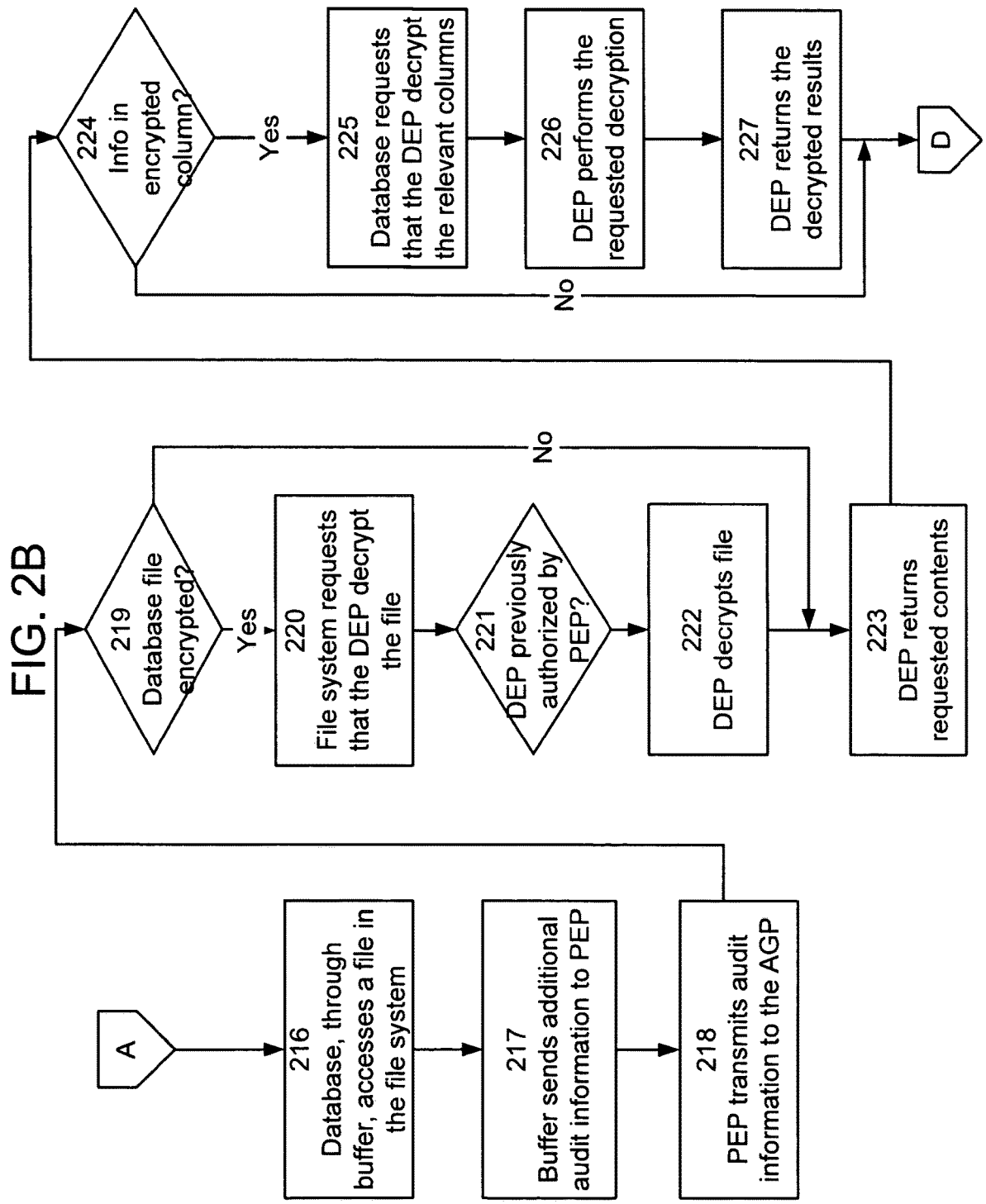

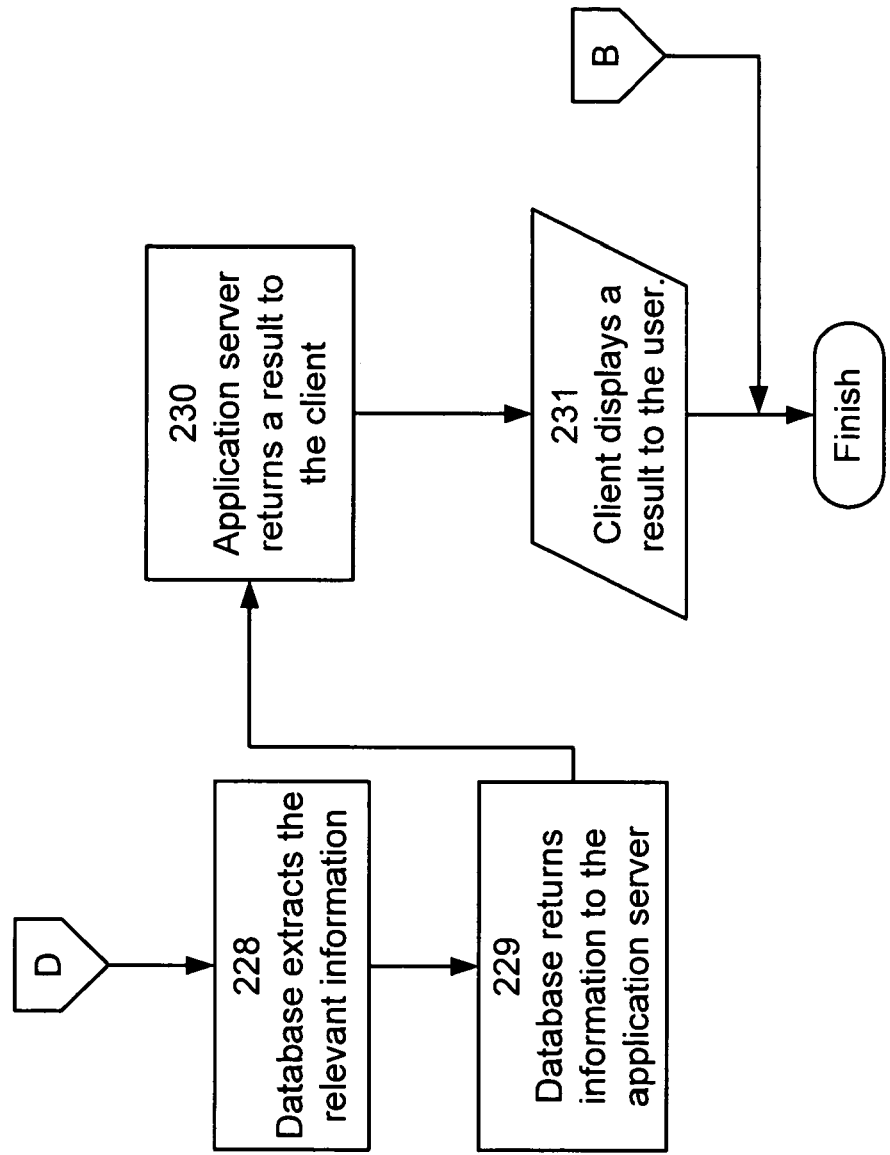

MULTI-LAYER SYSTEM FOR PRIVACY ENFORCEMENT AND MONITORING OF SUSPICIOUS DATA ACCESS BEHAVIOR

RELATED APPLICATION

This application is a continuation of U.S. application Ser. No. 14/181,825, filed Feb. 17, 2014, now issued as U.S. Pat. No. 8,935,787, which is a continuation of U.S. application Ser. No. 13/778,060, filed Feb. 26, 2013, now issued as U.S. Pat. No. 8,701,191, which is a divisional of U.S. application Ser. No. 11/357,741, filed Feb. 17, 2006, now abandoned, which claims priority from provisional U.S. Application Ser. No. 60/654,181, filed Feb. 18, 2005, all of which are incorporated in their entirety.

FIELD OF DISCLOSURE

The disclosure is directed to software for interacting with a database, and in particular, to software for interacting with databases that include encrypted data.

BACKGROUND

It is difficult to detect advanced attacks on data and data misuse by monitoring only one system layer. It is likewise difficult to attain acceptable performance in using external policy driven encryption systems.

One difficulty arises because large amounts of encrypted data are exposed when providing an efficient search on encrypted data. In addition, large amounts of sensitive data are exposed when using effective performance optimization to offload cryptographic operations. This results in exposure of data in memory or disk, outside of the control of the security/encryption system.

SUMMARY

In general, in some aspects, a method for controlling data access in a data-at-rest system includes executing a link intrusion prevention analysis between multiple layers of the data-at-rest system, introducing a privacy policy at enforcement points that span multiple system layers, and dynamically altering the privacy policy.

In some implementations, the method includes one or more of the following features. The data-at-rest system is a database system. The method further includes modifying the protection of data at one of the multiple system layers. The step of modifying is performed based on a result of the link intrusion prevention analysis. The privacy policy includes access control information. The privacy policy includes intrusion detection information. The privacy policy includes cryptographic information.

In general, in some aspects, a method for controlling access to a database system includes assigning a first access criterion and a second access criterion to a user role, receiving a query from a user, the user having an access history, determining that the user matches the user role, comparing, in a first system layer, the access history to the first access criterion, and comparing, in a second system layer that differs from the first system layer, the access history to the second access criterion.

In some implementations, the method includes one or more of the following features. The first access criterion comprises a privacy policy. The method further includes learning a value for the first access criterion. The method further includes selecting a response to the query, wherein the response is selected from the group consisting of blocking the query, alerting a system administrator and allowing the query, and allowing the query. Selecting a response to the query comprises selecting a response to the query based on a result of the step of comparing in a first system layer.

In general, in some aspects, a method for accessing data includes in a first system layer, receiving a first request from a user, the user having an access history, the access history including a counter, in the first system layer, comparing the counter to a first threshold, transmitting a second request to a second system layer, the second request being based on the first request.

In some implementations, the method includes one or more of the following features. The method further includes comparing the counter to a second threshold. The counter includes a scorecard. The method further includes determining that the counter exceeds a third threshold, and alerting a system administrator. The method further includes, in the first system layer, transmitting a notification to the second system layer to deny the second request.

The present invention also features a computer-readable medium that contains instructions (i.e., instructions stored on the computer-readable medium) that causes a computer to perform the methodologies of the present invention. As is known to those skilled in the art, a computer-readable medium is any of a number of mediums or articles of manufacture that contains information that can be read by a computer by a computer. Such computer readable media includes for example, magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; and paper media, such as punched cards and paper tape.

Other general aspects include other combinations of the aspects and features described above and other aspects and features expressed as methods, apparatus, systems, program products, and in other ways.

Advantages and features will become apparent from the following description and claims.

DESCRIPTION OF DRAWINGS

FIGS. 2A, 2B, 2C, 4A, 4B, and 5 are flow charts.

DETAILED DESCRIPTION

The system described herein is intended to be integrated into that described in U.S. Pat. No. 7,120,933, and entitled METHOD FOR INTRUSION DETECTION IN A DATABASE SYSTEM, the contents of which are herein incorporated by reference A method and system for overcoming the foregoing difficulties provides for the introduction of a privacy policy with enforcement points that span multiple system layers. The privacy policy is coupled with link intrusion prevention analysis between multiple system layers. The scope, both in data and in time, for enforcing data privacy and encryption is then dynamically optimized between multiple system layers.

As used herein, multiple system layers includes application database sessions, table data access, table space access, and database file level access. The term "transaction" is intended to include queries. The term "data at rest" is intended to include all forms of stored data. A "data-at-rest system" includes any system for storing data.

In a system for overcoming the foregoing difficulties, selected rules control the amount of data that is exposed, and the time window for exposure of unencrypted data. A policy underlying the selected rules defines the extent to which data privacy is to be enforced for particular data. This extent, which includes the extent of the particular data exposed and the duration of such exposure, is determined on the basis of the sensitivity of the particular data.

Dynamic control over the extent and duration of unencrypted-data exposure required to satisfy a user transaction is provided by linking the intrusion detection point ("IDP"), the policy enforcement point ("PEP"), the audit generation point ("AGP"), and the data-at-rest encryption point ("DEP"). These scopes are controlled by an operational sensitivity class defined in the policy. The operational sensitivity class defines what rules to check and when to do so by linking the IDP, the PEP, the AGP, and the DEP.

At the intrusion detection point, a scorecard is provided to accumulate violation attempts. On the basis of the number of violation attempts, session statistics, and data access statistics spanning multiple system layers, one can determine whether a threshold indicative of an attack has been reached.

A system as described above enhances the ability to detect advanced attacks on data as well as instances of data misuse. The system also reduces the extent to which data is exposed and outside the control of the security/encryption system, both in terms of the amount of data being exposed and the duration of such exposure. In addition, the system enables effective performance optimization and offloading of cryptographic operations.

Figure 1:
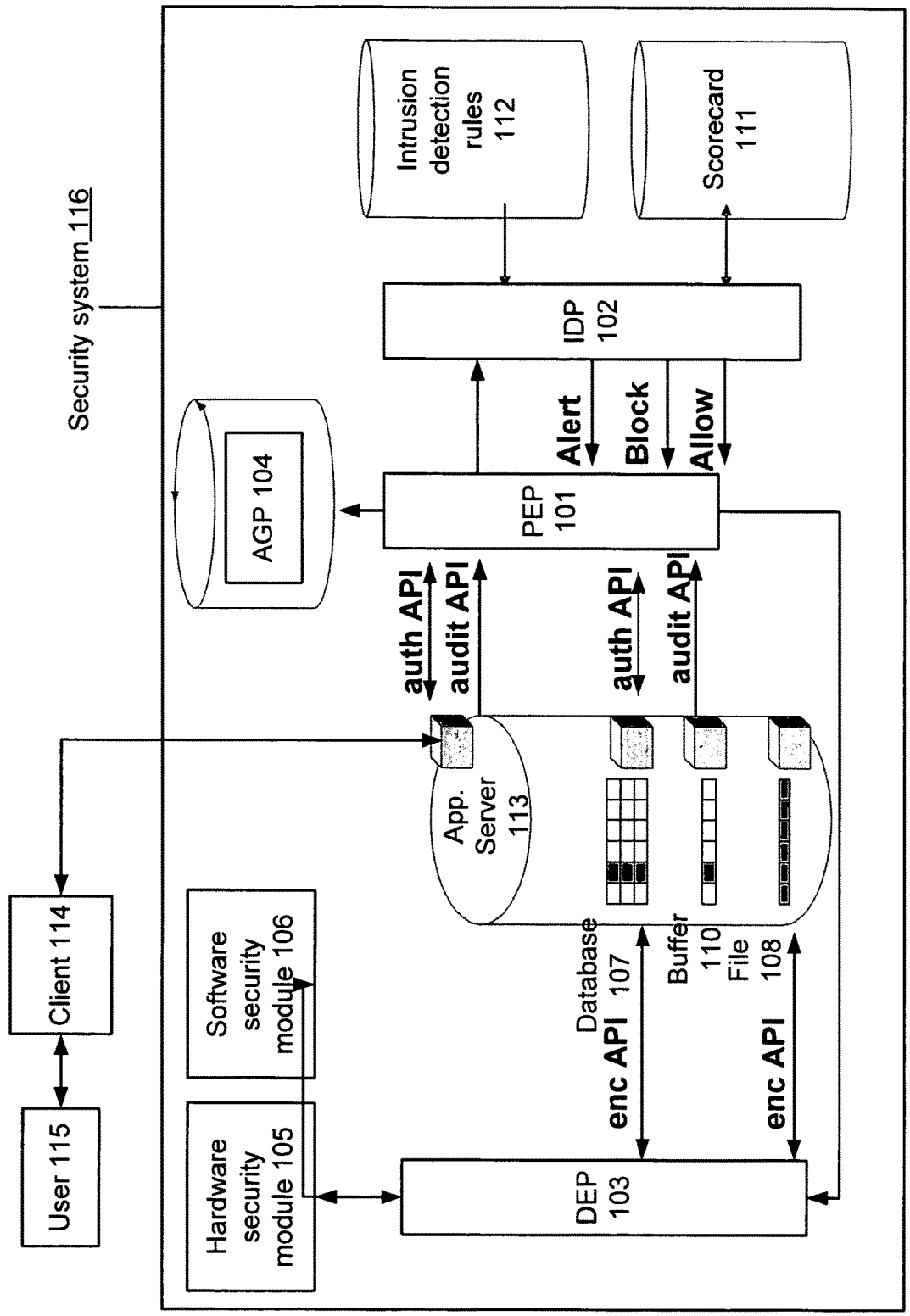
FIGS. 1, 3 and 6 are block diagrams of database systems.

In an exemplary security system 116, depicted in FIG. 1, a user 115 communicates through a client 114, which interacts with an application server 113. The application server 113 communicates with a PEP 101 to request authorization and to transmit auditing data. The application server 113 also passes queries along to a database 107, which itself communicates with the PEP 101 to request authorization. The database process 107 also communicates with a DEP 103 to request decryption. The DEP 103, in term, utilizes a hardware security module ("HSM") 105 and a software security module ("SSM") 106.

The database process 107 transmits requests to its buffer 110, which (through a process overseeing the buffer) sends audit information to the PEP 101. The buffer process then transmits requests to a file system file 108, which also communicates with the DEP 103 to request that a file be decrypted.

The PEP 101 communicates directly with the DEP 103 to provide authorization for other components to decrypt files. The PEP 101 interacts with the AGP 104 to store audit information. The PEP 101 calls the IDP 102 to provide information used in determining whether a given query should be allowed. In response, the IDP 102 tells the PEP 101 that a given query should either be allowed, blocked, or allowed but with an alert sent to the system administrator. It performs this task with the aid of intrusion detection rules 112 and a scorecard 111 associated with each user.

The DEP 103 can be optimized to perform at a layer that allows granularity (e.g., operations on a table cell vs. a table vs. an entire database vs. an entire file system) in compliance with a privacy policy. The DEP 103 can then dynamically dispatch an operation to be performed, either by a hardware security module ("HSM") 105 or by a software encryption engine 106, or a combination thereof. The DEP 103 can operate on an in-memory database or on a disk.

Operations on different levels of granularity may be achieved, in the depicted example, by associating the DEP 103 with multiple layers of the database hierarchy. The DEP 103 is connected to The database process 107 and the data store (file system) layer 108. An encryption request originating at the database layer 302 permits the DEP 103 to encrypt data in an individual row, column, or cell. (It might also, however, permit a database administrator to decrypt data for which the administrator lacks authorization.) In some embodiments, an encryption request originating at the file system layer 108 permits the DEP 103 to encrypt data in an individual file system file, thereby preventing a database administrator from accessing sensitive data.

If permitted by the privacy policy, the DEP 103 can, under certain conditions, dynamically re-route a decryption request from a software security module 106 to a hardware security module 105. Exemplary conditions include having a message size larger than a predetermined size. This dynamic re-routing optimizes performance and offloads cryptographic operations.

Upon detecting an attack, the PEP 101 can carry out any combination of the following options: issuing a security alert, blocking access to selected data, disabling one or more users, and disabling a request.

FIGS. 1 and 2A-2C illustrate one example of the operation of a system including a PEP 101, an IDP 102, a DEP 103, and an AGP 104. In this example, a database user 115 initiates a transaction through a client 114, such as a web browser (step 201). The client 114 sends a request to an application server 113, e.g., a web server (step 202).

The application server 113 initiates an authentication request with the PEP 101 (step 203). The PEP 101, in conjunction with the IDP 102, verifies the user's authorization, as described in more detail below in connection with FIGS. 5A and 5B (step 204). If the user is not authorized (step 205), the PEP blocks the query (step 213). If the user is authorized, then the application server 113 sends auditing information to the PEP 101 (step 206), which the PEP 101 transmits to the AGP 104 (step 207). Audit information includes the database user ID, the date and time, the SQL query and other action details, the originating machine name or IP address, and the database name.

The application server 113 then sends a request to a database 107 (step 208). The database process 107 again seeks authorization from the PEP 101 (step 209). The PEP 101 again in conjunction with the IDP 102 verifies the user's authorization as described in connection with FIGS. 5A and 5B (step 210). If authorization is granted (step 211), the PEP 101 transmits the authorization to the database process 107 as well as to the DEP 103 (step 212). The authorization to the DEP 103 indicates that the database process 107 is permitted to access decryption keys associated with columns to which the user 115 has access. If authorization is refused, the PEP 101 blocks the query (step 213) and The database process 107 returns an error (step 214), which the client 114 propagates to the user 115 (step 215).

If the PEP 101 grants authorization, a database process 107 accesses a file 108 in the file system, through the database's buffer 110 to read the relevant data (step 216). A computer process overseeing the buffer 110 sends additional audit information to the PEP 101 (step 217), which the PEP 101 transmits to the AGP 104 (step 218). If the database file 108 is encrypted (step 219), the file system requests that the DEP 103 decrypt the file (step 220). If the DEP 103 has been previously authorized by the PEP 101 in step 212 (step 221), then the DEP 103 decrypts the file using a hardware security module ("HSM") 105 and/or a software decryption engine 106 (step 222), and returns the requested contents (step 223).

The database process 107 then checks to see if any of the requested information is in an encrypted column (step 224). If so, the process overseeing the database process 107 requests that the DEP 103 decrypt the relevant columns (step 225). The DEP performs the requested decryption using the HSM 105 and/or the software decryption engine 106 (step 226), and returns the decrypted results (step 227).

The database process 107 extracts the relevant information (step 228) and returns it to the application server 113 (step 229). The application server 113 returns a result to the client 114 (step 230), which displays a result to the user 115 (step 231).

Often, many application users will share a single database user. In some examples, a PEP 101 connected to the database server utilizes the identity of the application user (in addition to or instead of the database user) as a factor in determining whether a given request is authorized. The PEP 101 does this by communicating with an application user mapping table located within the application server's security system 312. The table contains a mapping associating the application user with the database user. Real time mapping data provides information about which application user is using the database connection at any given time. In some examples, the mapping table is stored in a database table. In other examples, the mapping table is stored in a file. In still other examples, the table, or simply the identity of the application user, is transmitted by the application server to the database server during the session.

Figure 3:
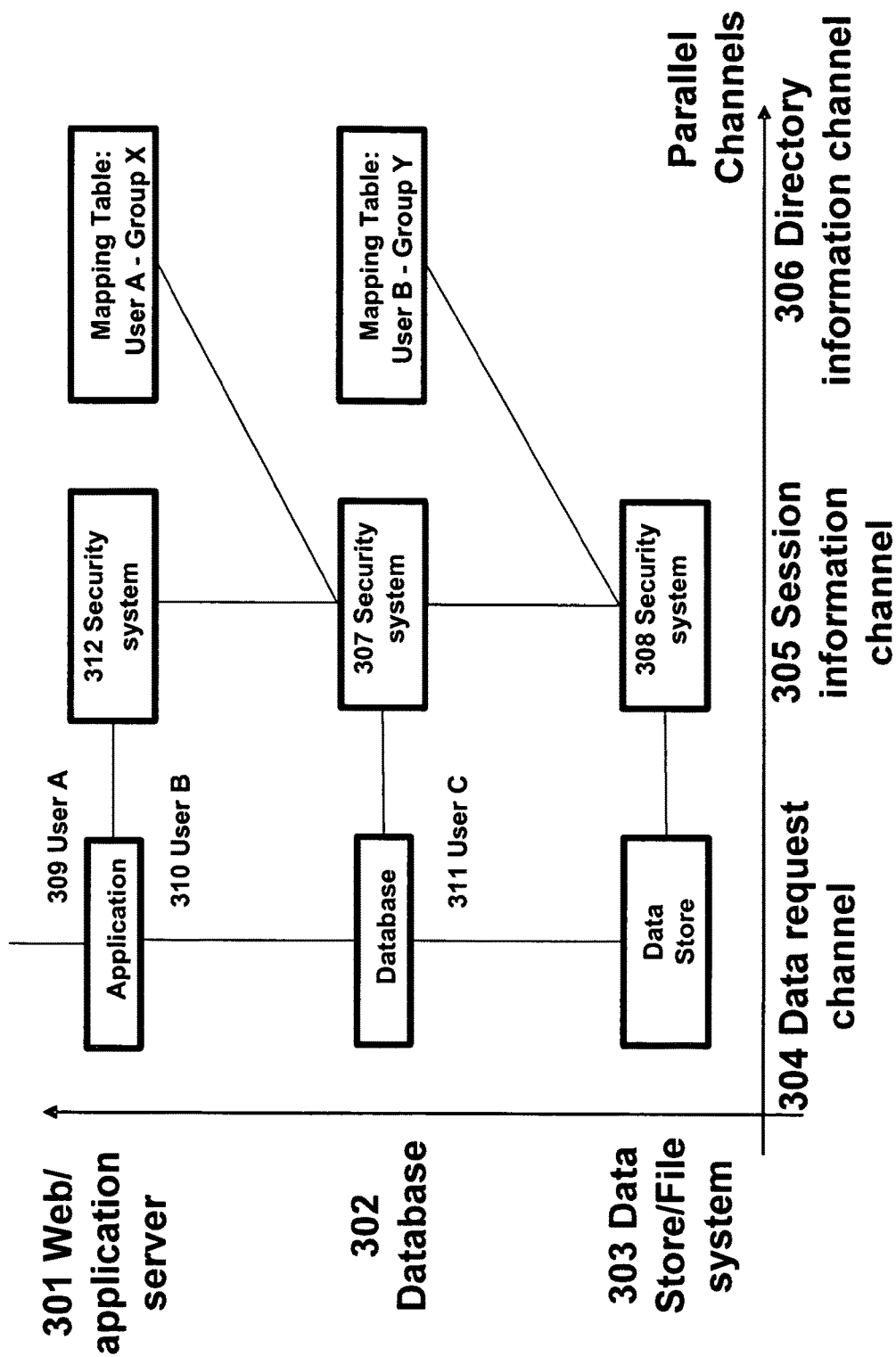

As illustrated in FIG. 3, in some examples, security components are connected to three levels: the web or application server 301; the database 302; and the data store or file system 303. Services on these three levels communicate across multiple channels: the data request channel 304; the session information channel 305; and the directory information channel 306. In the depicted example, user A 309 is logged in to an application. The application requests data, as user B 310, over the data request channel 304, from the database. The database is running as user C 311 on a server, and requests data, over another data request channel, from the data store (e.g., the file system).

Meanwhile, on the application server 301, a mapping table, which associates user A 309 (the application user) with user B 310 (the database user), is maintained. This information may be communicated, via a separate session information channel 305, to the database's security system 307.

Examples of further details of the operation of the PEP 101, the IDP 102, and the DEP 103 are provided below. The boundaries of the functions performed by the IDP 102, the PEP 101, the AGP 104, and the DEP 103 are not fixed; some functions may be combined in a single component, or allocated differently between components.

A. PEP

Figure 4A:
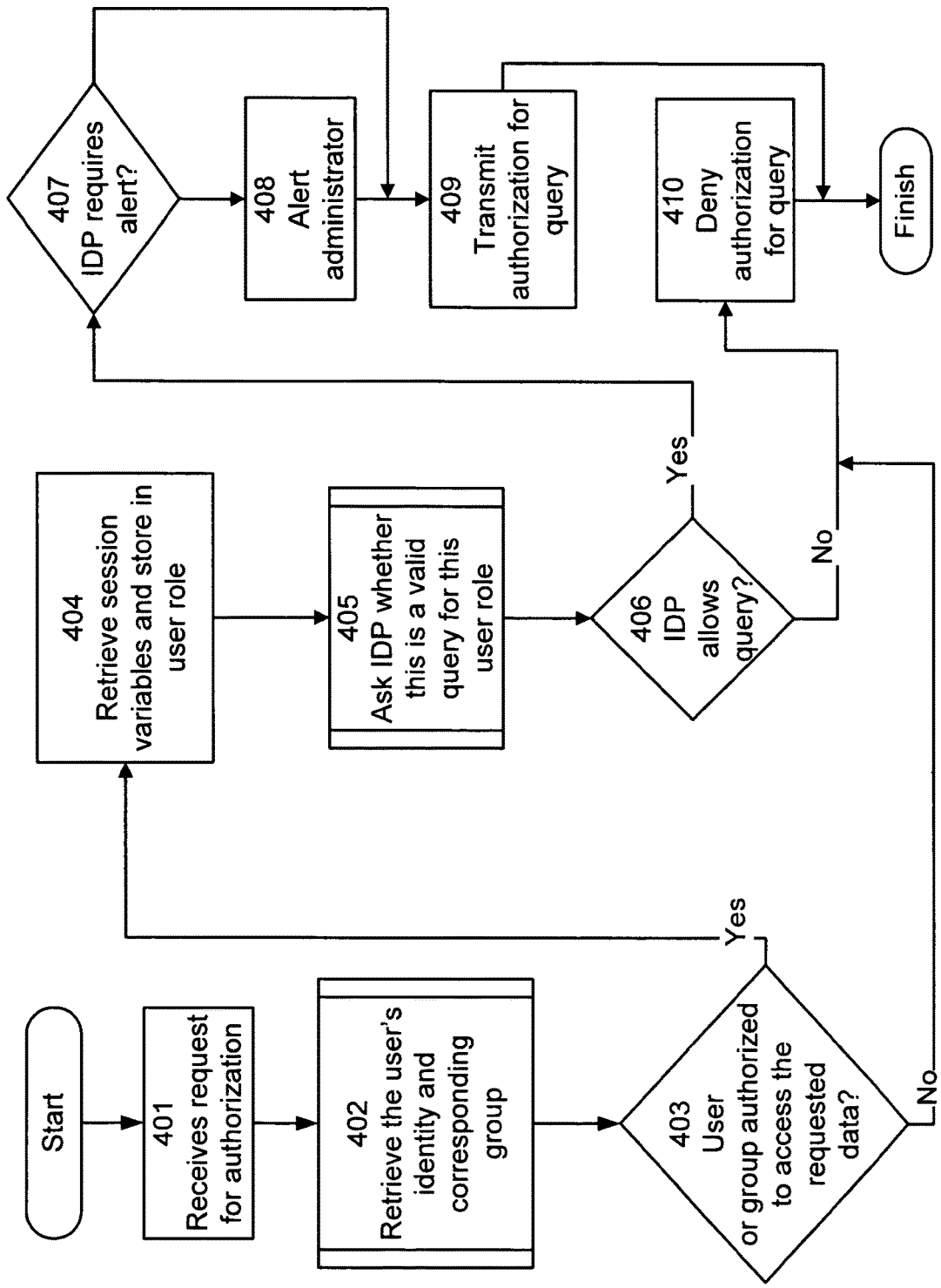

FIG. 4A explains in further detail an example of operation of the PEP 101 (see FIG. 2, steps 204 and 210). First, the PEP 101 receives a request for authorization (step 401). The PEP 101 then retrieves the user's identity and corresponding group, as described below in connection with FIG. 4B (step 402). The PEP 101 then determines whether the user or group is authorized to access the requested data, for example, by consulting a privacy policy or access control list (step 403). If the user or group is unauthorized to access the requested data, the PEP 101 skips to step 410.

If the user or group is authorized, the PEP 101 then retrieves session variables (including the time of day, day of week, IP address from which the user is logged in, the user's geographic location, the user's identity, the user's group, the user's client's software, etc.), and stores these variables as the user's "role" (step 404). The PEP 101 then communicates with the IDP 102 to determine whether the query is valid for the user's role (step 405). The IDP makes this determination in a process exemplified by FIG. 5. The PEP 101 determines whether the IDP 102 allowed the query (step 406). If the IDP 102 rejects the query, the PEP 101 skips to step 410.

If the query was allowed, the PEP 101 checks to see whether the IDP 102 indicated that an alert was to be sent to the system administrator (step 407). If so, the PEP alerts the administrator (step 408). In either event, the PEP 101 authorizes the query (step 409). If the query was not allowed, the PEP 101 denies authorization for the query (step 410).

Figure 4B:
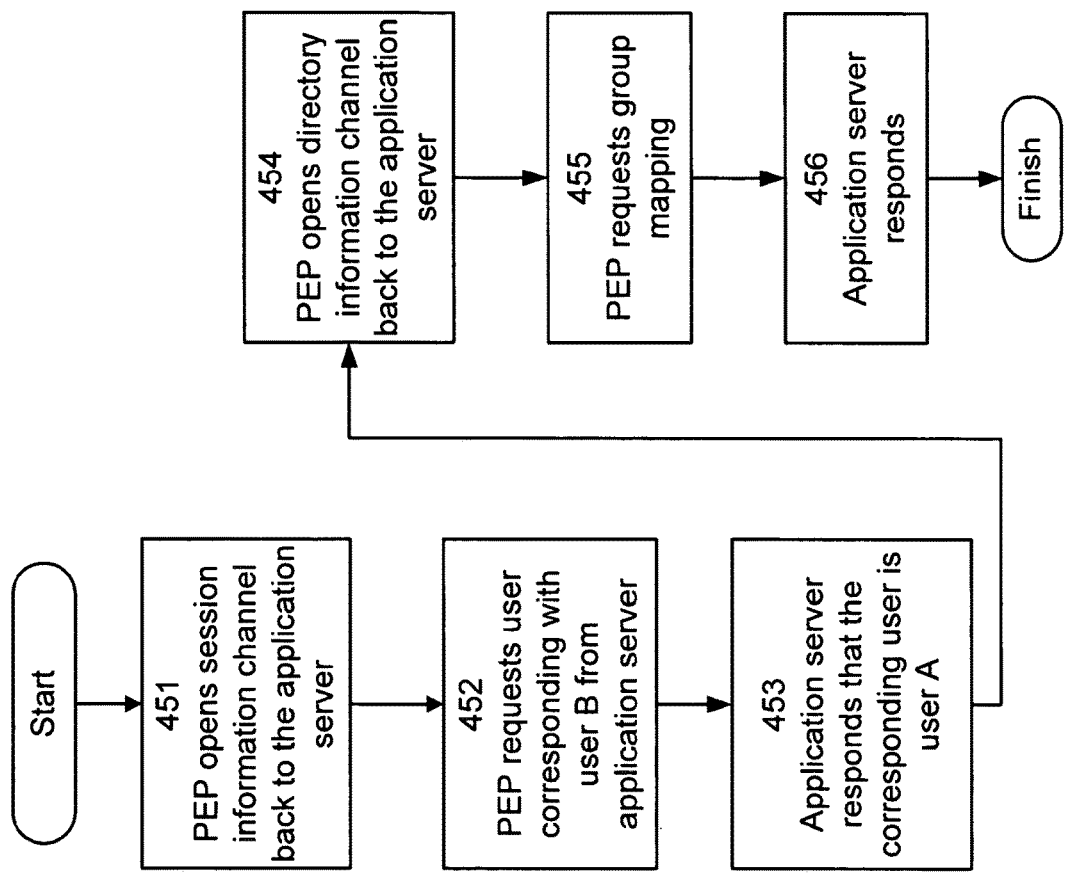

FIG. 4B describes how, in some examples, the database's security system 307 retrieves the user's identity and corresponding group in step 402. First, the PEP 101 in the database's security system 307 opens a session information channel 305 to the application server 301 (step 451). Next, the PEP 101 requests, from a mapping table in the application's security system 312, the application user corresponding to the current database user (for example, user B 310) (step 452). The application server responds, for example, that the corresponding user is user A 309 (step 453).

Next, the PEP 101 opens a separate directory information channel 306 back to the application server 301 (step 454). On the directory information channel 306, the PEP 101 requests the group mapping for user A 309 (step 455). In a typical response, the application server 301 indicates that user A 309 is a member of group X (step 456).

FIG. 4B describes the process by which the PEP 101 in the database's security system 307 retrieves information from the application server 301. In some examples, the PEP 101 in the data store's security system 308 requests the identity of the database user (i.e., user B 310) from the PEP 101 in the database security system 307 over the session information channel 305. The PEP 101 in the data store's security system 308 may also ascertain the database user's group over the directory information channel 306.

In some examples, the PEP 101 in the data store's security system 308 can identify the application user by requesting the information from the PEP 101 in the database's security system 307, which then relays the query to the application server's mapping table 311. Similarly, in some examples, the PEP 101 in the data store's security system 308 can ascertain the application user's group, by requesting the information from the PEP 101 in the database's security system 307, which then relays the query to the mapping table 311 in the application server.

In some practices, a database's security system 307 (for example, through its PEP 101) notifies other layers to indicate that a severe attack has occurred. In some practices, the IDP 102 in the application server's security system 312 receives this notification and subsequently blocks all access attempts that would otherwise have only triggered an alert to the system administrator. In some practices, the DEP 103 in the data store's security system 308 receives this notification and blocks all subsequent requests to decrypt data.

One example of these practices is provided where a PEP 101 detects that authorized access to credit card information at the database level exceeds normal usage, but not is not at a critical level. The PEP 101, in this example, modifies a privacy policy to instruct the application server's security system 312 to block further access attempts. In another example, the PEP 101 in the application server's security system 312 detects multiple hacking attempts from multiple locations. The security system 312 modifies a privacy policy to block requests at the application server 312 level, increase file security at the data store's security system 308, and prevent the data store's security system 308 as well as the database's security system 307 from decrypting sensitive data.

B. IDP

In some embodiments, the IDP 102 has a learning mode and an enforcement mode. In learning mode, the IDP 102 acquires information about users of the system, including the typical time of day and day of week during which they access the system, the resources they usually access, their physical location or IP address, and the volume of data they usually access. In some examples, the IDP 102 maintains a Bayesian network to associate authorized accesses with these variables. In other examples, other types of learning may be used. When the IDP 102 is in enforcement mode, it denies access to a user when the time or day of access, the resources accessed, the user's location or IP address, or the volume of data requested exceeds a learned threshold or differs from learned values. The IDP 102 optionally alerts a system administrator when any of these criteria exceeds a learned threshold or differs from learned values.

In some embodiments, the IOP 102 accepts user logins only during certain times of day, or only on certain days of the week, or only from certain physical locations. In some examples, the IDP 102 learns how these criteria should be restricted. In other examples, the system administrator manually enters restrictions. In some examples, the system administrator manually changes restrictions, for example, to temporarily allow a particular user to log in from a distant location when the user is on vacation.

In some embodiments, the IDP 102 restricts the volume of data a user may access in a given day. In one example, the IDP 102 permits a user to access only a predetermined number of rows per day from a given table. In another example, the IDP 102 permits a user to issue only a predetermined number of queries per day in a given table. In other examples, the user is restricted to a given volume of data over the entire database, rather than in specific tables. In some examples, the IDP 102 uses a counter to maintain information about the volume of data a user has accessed by means of a counter.

In some examples, an IDP 102 restricts access based on the user's role. A user's role may be based on his or her identity, the time of day, the day of week, the IP address being used, the country or geographic region from which the request originates, etc. In some examples, an IDP 102 located in the database server sets a maximum number of rows per day accessible to users in a given role. Some examples restrict the number of rows a user in a given role may insert, or the number of rows a user in a given role may modify, or the number of rows a user in a given role may delete. In some examples, these values are learned while the IDP 102 is in learning mode.

Some examples permit the IDP 102 and/or the PEP 101 to communicate with a trusted component running on an authorized client to further assist in user authentication.

In some examples, the IDP 102 utilizes one or more of the following criteria to decide whether to permit access, block access, or alert the administrator: session authorization (i.e., the user's identity); session authentication (i.e., the resources a user is entitled to access); session encryption; password integrity; database software integrity; application data integrity; database metadata integrity; security software integrity; time of day of access; and signature rules (i.e., pattern matching and content analysis to detect any known attack signature using, e.g., Snort® network intrusion detection software). To verify data or software integrity, a hash value is stored and verified against periodically.

In some examples, the IDP 102 triggers an alert whenever a particular user accesses an abnormally high volume of data. When this alert is triggered, the PEP 101 analyzes an audit log to ascertain whether unusual activity is occurring. If so, the IDP 102 can disallow further accesses by the current user, and/or send an alert to a system administrator.

Figure 5:
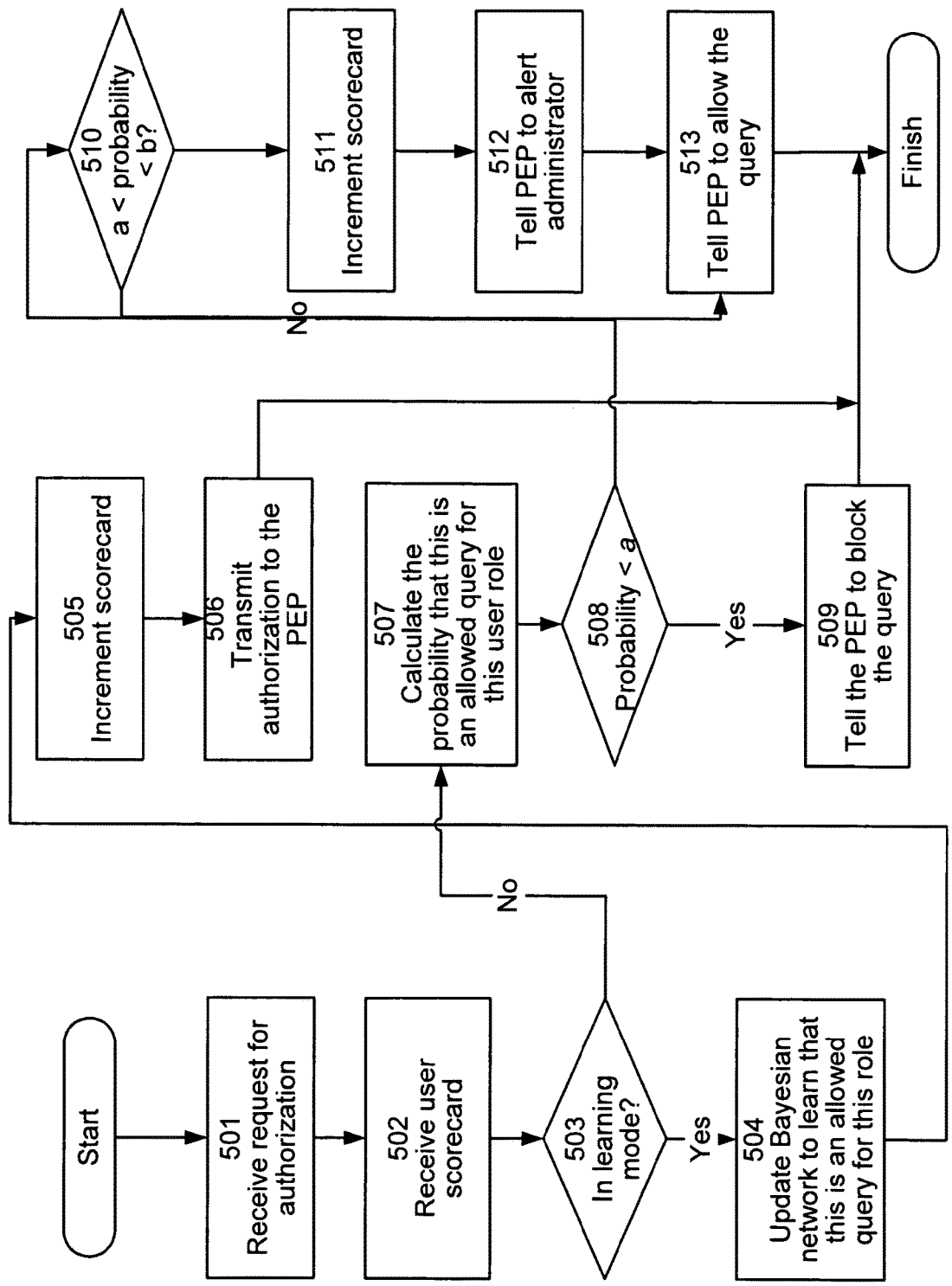

An example of the operation of the IDP 102 will now be described with reference to FIG. 5. First, the IDP 102 receives a request for authorization from the PEP 101 (step 501). The request includes information about the user's role (see FIG. 4A, step 404). The request also includes a query the user seeks to execute. The IDP 102 next retrieves the user's scorecard 111 (including variables tracking a user's total volume of access in a given time period, e.g., total number of rows accessed in a day, total kilobytes of data downloaded in a day, etc.) (step 502).

Next, the IDP 102 checks to see if it is in learning mode (step 503). If it is, then the IDP 102 updates a Bayesian network to learn that the query is authorized for this user role (step 504). Next, the IDP 102 adds data from the current query to the user's scorecard 111 (step 505). Finally, the IDP 102 transmits authorization to the PEP 101 (step 506).

If the IDP is not in learning mode, then the IDP 102 calculates the probability that the query is allowed for the user's role (step 507). If this probability is below a predetermined threshold a (step 508), then the IDP 102, tells the PEP 101 to block the query (step 509). If, instead, the probability is between the threshold a and a predetermined threshold b, where b>a (step 510), then the IDP 102 adds the data from the current query to the scorecard 111 (step 511), allows the query, and tells the PEP 101 to send an alert to a system administrator (step 512). If the probability is greater than the threshold b, the IDP 102 simply allows the query (step 513).

More generally, in some examples, the IDP 102 maintains a set of i thresholds $t_i$. For each interval $[t_i, t_i+_1)$, a different action $k_i$ is defined. If the probability that the query is allowed is within the interval $[t_i, t_i+_1)$, then the action $k_i$ is performed.

In some examples, the IDP 102 increments the value on the scorecard 111 in response to accesses, or attempted accesses, to sensitive resources. In some examples, sensitive resources include access to prespecified applications and prespecified network addresses. In other examples, the IDP 102 increments the value of the scorecard by a greater amount in response to a failed or disallowed attempt to access the sensitive resource.

C. DEP

Figure 6:
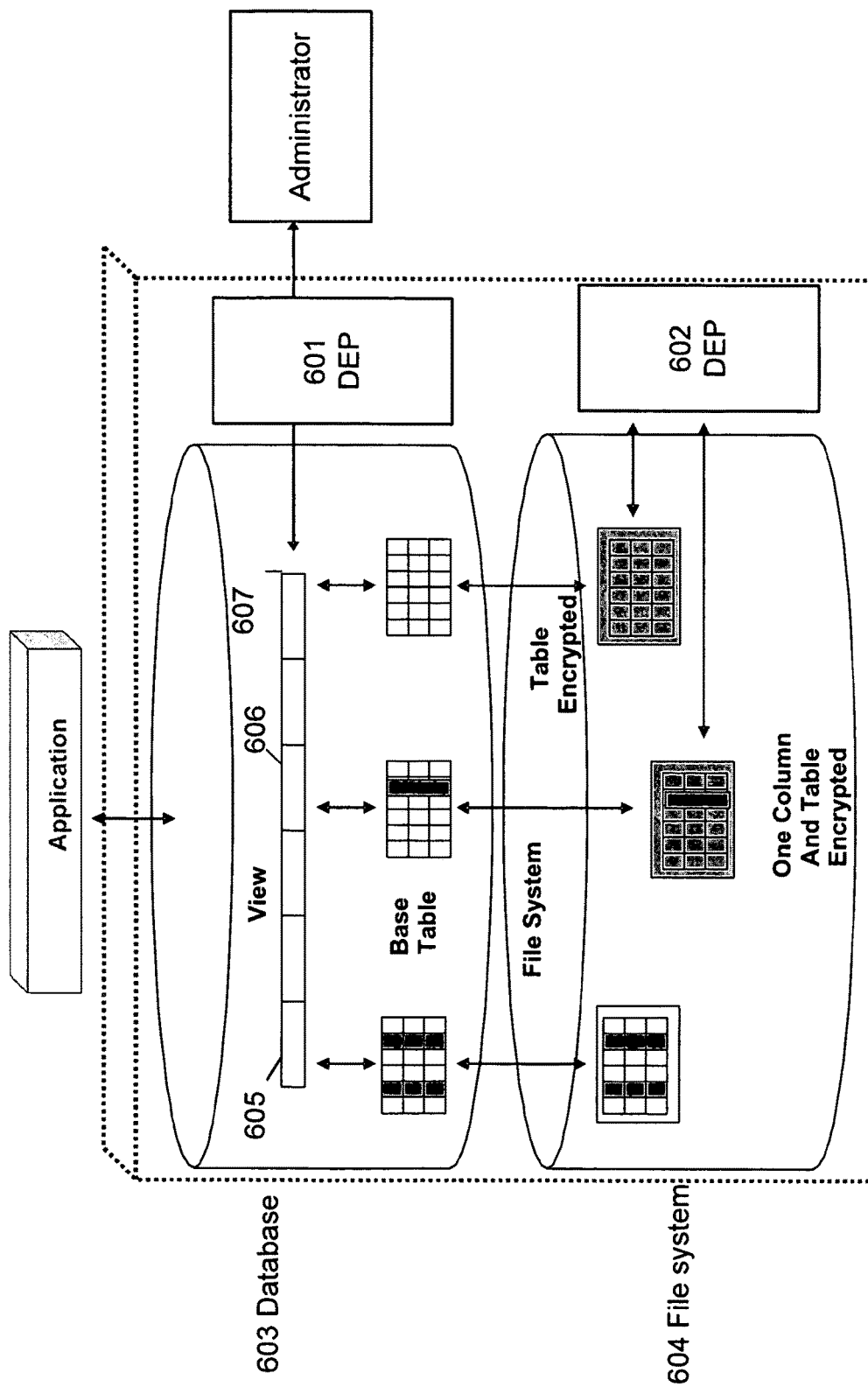

FIG. 6 depicts an example of interaction between a DEP 601 connected to a database 603 and a DEP 602 connected to a file system 604. In one example view 605, two columns are encrypted, but the table itself is not. In this example, authorization is handled entirely by the database's DEP 601. In a second example view 606, one column is encrypted, and the table is encrypted as well. In this example, the database's DEP 601 provides the decryption key for the column, while the file system's DEP 602 provides the decryption key for the table. In this example, a database administrator would be precluded from accessing secure data due to the table-level encryption. In the third example view 607, no columns are individually encrypted; but the table is encrypted. In this example, the file system's DEP 602 provides the decryption key.

In some examples, when a PEP 101 determines that a given query is to be blocked, it performs one or more of the following tasks: disconnecting the user; denying access to cryptographic keys; writing a record in a log file; and sending an error return code, coupled with no data, back to the requesting application.

In some examples, the PEP 101 includes a machine and program authorization (MPA) component. This component prevent or restrict users with valid login names and passwords from connecting to the database unless they access the database from a machine that has been preauthorized. Machines are authorized if they have an authorized IP address, and additionally, if they are able to specify both the port on which the database server is listening and the name of the database.

In some examples, the PEP 101, IDP 102, DEP 103, and AGP 104 are part of the Protegrity™ Secure.Data server, which is available from Protegrity Corporation of Stamford, Conn.

It is to be understood that while the invention has been described in conjunction with the detailed description thereof, the foregoing description is intended to illustrate and not limit the scope of the invention, which is defined by the scope of the appended claims.

Having described the invention, and a preferred embodiment thereof, what is claimed as new, and secured by Letters Patent is:

1. A method for controlling access to data in a database, the method comprising:
   receiving a request for data residing in one or more data files within a file layer stored in a memory of a hardware database processing system;
   determining, by an application layer stored in the memory of the hardware database processing system, whether the received request comprises an unauthorized application layer access attempt using a policy enforcement server communicatively coupled to the application layer, the policy enforcement server configured to determine that the received request is unauthorized by querying an intrusion detection point to determine whether a threshold number of violation attempts has been reached, wherein the threshold number of violation attempts is based on a sensitivity of the requested one or more data files, and wherein the intrusion detection point tracks violation attempts by incrementing a value representative of the tracked violation attempts by a first amount in response to a successful attempt to access the requested data, and by incrementing the value representative of the tracked violation attempts by a second amount greater than the first amount in response to a failed attempt to access the requested data;
   in response to determining that the received request is not an unauthorized application layer access attempt, forwarding the received request from the application layer stored in the memory of the hardware database processing system to a table layer stored in the memory of the hardware database processing system;
   determining, by the table layer stored in the memory of the hardware database processing system, whether the received request comprises an unauthorized table layer access attempt using the policy enforcement server, the policy enforcement server communicatively coupled to the table layer; and
   in response to determining that the received request is not an unauthorized table layer access attempt, granting access to the requested data.

2. The method of claim 1, wherein the request for data is received from a user associated with an access history, and wherein determining whether the received request comprises an unauthorized application layer access attempt comprises:
   determining a user role associated with the user, the user role corresponding to a first access criterion associated with the application layer; and
   comparing the user's access history to the first access criterion to determine whether the received request comprises an unauthorized application layer access attempt.

3. The method of claim 2, wherein the user role further corresponds to a second access criterion associated with the table layer, and wherein determining whether the received request comprises an unauthorized table layer access attempt comprises:
   comparing the user's access history to the second access criterion to determine whether the received request comprises an unauthorized table layer access attempt.

4. The method of claim 3, wherein the first and second access criteria each comprise at least one of: session authorization information, session authentication information, session encryption information, password integrity information, software integrity information, application data integrity information, database metadata integrity information, security software integrity information, time of day information, and signature rules information.

5. The method of claim 1, further comprising modifying a protection of data at one or more of the application layer or the table layer based on determining that the received request comprises an unauthorized application layer access attempt or an unauthorized table layer access attempt.

6. A non-transitory computer-readable storage medium containing computer-executable instructions for controlling access to data in a database, the instructions configured to, when executed, cause a hardware database processing system to perform steps comprising:
   receiving a request for data residing in one or more data files within a file layer stored in a memory of the hardware database processing system;
   determining, by an application layer stored in the memory of a hardware database processing system, whether the received request comprises an unauthorized application layer access attempt using a policy enforcement server communicatively coupled to the application layer, the policy enforcement server configured to determine that the received request is unauthorized by querying an intrusion detection point to determine whether a threshold number of violation attempts has been reached, wherein the threshold number of violation attempts is based on a sensitivity of the requested one or more data files, and wherein the intrusion detection point tracks violation attempts by incrementing a value representative of the tracked violation attempts by a first amount in response to a successful attempt to access the requested data, and by incrementing the value representative of the tracked violation attempts by a second amount greater than the first amount in response to a failed attempt to access the requested data;
   in response to determining that the received request is not an unauthorized application layer access attempt, forwarding the received request from the application layer stored in the memory of the hardware database processing system to a table layer stored in the memory of the hardware database processing system;
   determining, by the table layer stored in the memory of the hardware database processing system, whether the received request comprises an unauthorized table layer access attempt using the policy enforcement server, the policy enforcement server communicatively coupled to the table layer; and in response to determining that the received request is not an unauthorized table layer access attempt, granting access to the requested data.

7. The computer-readable storage medium of claim 6, wherein the request for data is received from a user associated with an access history, and wherein determining whether the received request comprises an unauthorized application layer access attempt comprises:

determining a user role associated with the user, the user role corresponding to a first access criterion associated with the application layer; and comparing the user's access history to the first access criterion to determine whether the received request comprises an unauthorized application layer access attempt.

8. The computer-readable storage medium of claim 7, wherein the user role further corresponds to a second access criterion associated with the table layer, and wherein determining whether the received request comprises an unauthorized table layer access attempt comprises:

comparing the user's access history to the second access criterion to determine whether the received request comprises an unauthorized table layer access attempt.

9. The computer-readable storage medium of claim 8, wherein the first and second access criteria each comprise at least one of: session authorization information, session authentication information, session encryption information, password integrity information, software integrity information, application data integrity information, database metadata integrity information, security software integrity information, time of day information, and signature rules information.

10. The computer-readable storage medium of claim 6, further comprising modifying a protection of data at one or more of the application layer or the table layer based on determining that the received request comprises an unauthorized application layer access attempt or an unauthorized table layer access attempt.

11. A hardware database processing system for controlling access to data in a database, the system comprising:

a non-transitory computer-readable storage medium containing executable instructions configured to, when executed, perform steps comprising:

receiving a request for data residing in one or more data files within a file layer stored in a memory of the hardware database processing system;

determining, by an application layer stored in the memory of the hardware database processing system, whether the received request comprises an unauthorized application layer access attempt using a policy enforcement server communicatively coupled to the application layer, the policy enforcement server configured to determine that the received request is unauthorized by querying an intrusion detection point to determine whether a threshold number of violation attempts has been reached, wherein the threshold number of violation attempts is based on a sensitivity of the requested one or more data files, and wherein the intrusion detection point tracks violation attempts by incrementing a value representative of the tracked violation attempts by a first amount in response to a successful attempt to access the requested data, and by incrementing the value representative of the tracked violation attempts by a second amount greater than the first amount in response to a failed attempt to access the requested data;

in response to determining that the received request is not an unauthorized application layer access attempt, forwarding the received request from the application layer stored in the memory of the hardware database processing system to a table layer stored in the memory of the hardware database processing system;

determining, by the table layer stored in the memory of the hardware database processing system, whether the received request comprises an unauthorized table layer access attempt using the policy enforcement server, the policy enforcement server communicatively coupled to the table layer; and in response to determining that the received request is not an unauthorized table layer access attempt, granting access to the requested data; and a hardware processor configured to execute the instructions.

12. The system of claim 11, wherein the request for data is received from a user associated with an access history, and wherein determining whether the received request comprises an unauthorized application layer access attempt comprises:

determining a user role associated with the user, the user role corresponding to a first access criterion associated with the application layer; and comparing the user's access history to the first access criterion to determine whether the received request comprises an unauthorized application layer access attempt.

13. The system of claim 12, wherein the user role further corresponds to a second access criterion associated with the table layer, and wherein determining whether the received request comprises an unauthorized table layer access attempt comprises:

comparing the user's access history to the second access criterion to determine whether the received request comprises an unauthorized table layer access attempt.

14. The system of claim 13, wherein the first and second access criteria each comprise at least one of: session authorization information, session authentication information, session encryption information, password integrity information, software integrity information, application data integrity information, database metadata integrity information, security software integrity information, time of day information, and signature rules information.

15. The system of claim 11, further comprising modifying a protection of data at one or more of the application layer or the table layer based on determining that the received request comprises an unauthorized application layer access attempt or an unauthorized table layer access attempt.

* * * * *